United States Patent
David

(10) Patent No.: US 8,914,564 B2
(45) Date of Patent: Dec. 16, 2014

(54) PORT CONTROL APPARATUS AND ASSOCIATED METHODS

(75) Inventor: Thomas Saroshan David, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 12/981,021

(22) Filed: Dec. 29, 2010

(65) Prior Publication Data

US 2012/0173775 A1  Jul. 5, 2012

(51) Int. Cl.
*G06F 3/00* (2006.01)
*G06F 15/173* (2006.01)
*G06F 13/28* (2006.01)

(52) U.S. Cl.
CPC . *G06F 3/00* (2013.01); *G06F 13/28* (2013.01)
USPC .................................... 710/61; 709/239

(58) Field of Classification Search
CPC ............ G06F 11/0757; G06F 2201/88; G06F 9/30141; G06F 9/4881
USPC .......................................... 710/61; 709/239
See application file for complete search history.

(56) References Cited

U.S. PATENT DOCUMENTS

| 5,317,472 A * | 5/1994 | Schweitzer, III | 361/115 |
| 2002/0013881 A1* | 1/2002 | Delp et al. | 711/105 |
| 2002/0098006 A1* | 7/2002 | Tamaoki | 399/69 |
| 2002/0154726 A1* | 10/2002 | Miyake et al. | 377/20 |
| 2008/0313348 A1* | 12/2008 | Morris et al. | 709/239 |
| 2009/0216960 A1* | 8/2009 | Allison et al. | 711/149 |

OTHER PUBLICATIONS

Wiley, Definition of 'logic symbol', 2001, Wiley & Sons Ltd.*
Wiley, Definition of 'clock interrupt', 1998, Wiley & Sons Ltd.*
Maxim Integrated Products, "SMBus/I2C Interfaced 9-Port, Level-Translating GPIO and LED Driver with CLA," 30 pp., 2007.
Maxim Integrated Products, "16-Port I/O Expander with LED Intensity Control, Interrupt, and Hot-Insertion Protection," 27 pp., 2005.
Maxim Integrated Products, "10-Port I/O Expander with LED Intensity Control, Interrupt, and Hot-Insertion Protection," 24 pp., 2005.

* cited by examiner

*Primary Examiner* — Hyun Nam
(74) *Attorney, Agent, or Firm* — Law Offices of Maximilian R. Peterson

(57) ABSTRACT

A method of controlling a port in an apparatus includes receiving an instruction for execution by a processor. The method further includes executing the instruction, by writing a value to a storage location corresponding to the port, and by initializing a count operation. The method further includes proceeding with the count operation until a final count value is reached, and providing to the port the value written to the storage location.

19 Claims, 6 Drawing Sheets

PORT CONTROL APPARATUS AND ASSOCIATED METHODS

TECHNICAL FIELD

The disclosure relates generally to electronic circuitry and methods and, more particularly, to apparatus for port control or toggling in electronic circuitry such as processors, and associated methods.

BACKGROUND

Electronic systems, products, and devices often include circuitry or devices for processing information and data. The inclusion of processing capability has been in part in response to the relatively large increase in the amount of information or data generally.

Processors, such as microprocessors or microcontrollers are commonly used to process data or information. Typical microprocessors or microcontrollers include a number of ports for receiving or transmitting information, such as data, address, status, control signals, and the like. In some situations, a program running on the processor may interact with one or more ports.

SUMMARY

In one exemplary embodiment, a method of controlling a port in an apparatus includes receiving an instruction for execution by a processor, and executing the instruction, where the instruction is executed by writing a value to a storage location corresponding to the port, and by initializing a count operation. The method also includes proceeding with the count operation until a final count value is reached, and providing to the port the value written to the storage location.

In another exemplary embodiment, an apparatus includes a processor to receive an instruction and to execute the instruction. The apparatus also includes a storage device to store a datum derived from the instruction, where the datum is to be provided to a port. The apparatus further includes a timer to count to a count value before providing an output signal that is used to provide the first datum to the port.

In yet another exemplary embodiment, a method of using a processor to generate at least one pulse at an output of a port coupled to the processor includes receiving a program instruction, and decoding the program instruction to derive a datum and a count value. The method also includes executing the program instruction by storing the datum and by initializing a count. The method further includes writing the datum to the port when the final count value is reached.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosure relates to electronic apparatus and associated methods for enhanced functionality in microcontrollers, microprocessors, digital signal processors (DSPs), and the like (generally processors). Exemplary embodiments provide apparatus and associated methods for port control, also known as port toggling in processors. The disclosure applies to port control or port toggling. The description in this document may use the term "port control" and/or "port toggling." The described apparatus and method apply to both port control and port toggling, regardless of the terminology.

Port control or toggling may occur under control of software running on processors. In exemplary embodiments, such port control or toggling may occur in the in the presence of one or more sources of asynchronous bus masters, such as a direct memory access (DMA) engine. An example of such a system or apparatus according to an exemplary embodiment may include one or more cores from Advanced RISC machines (ARM) and one or more asynchronous bus masters, such as DMA engine(s) or controllers.

In such situations, the setting and clearing of port(s) may occur one or more cycles apart and, therefore, may take or occupy an indeterminate amount of time. Exemplary embodiments accommodate such situations, and provide the advantage of allowing generation of pulses for port control or toggling for defined or desired period under software control.

Figure 1:
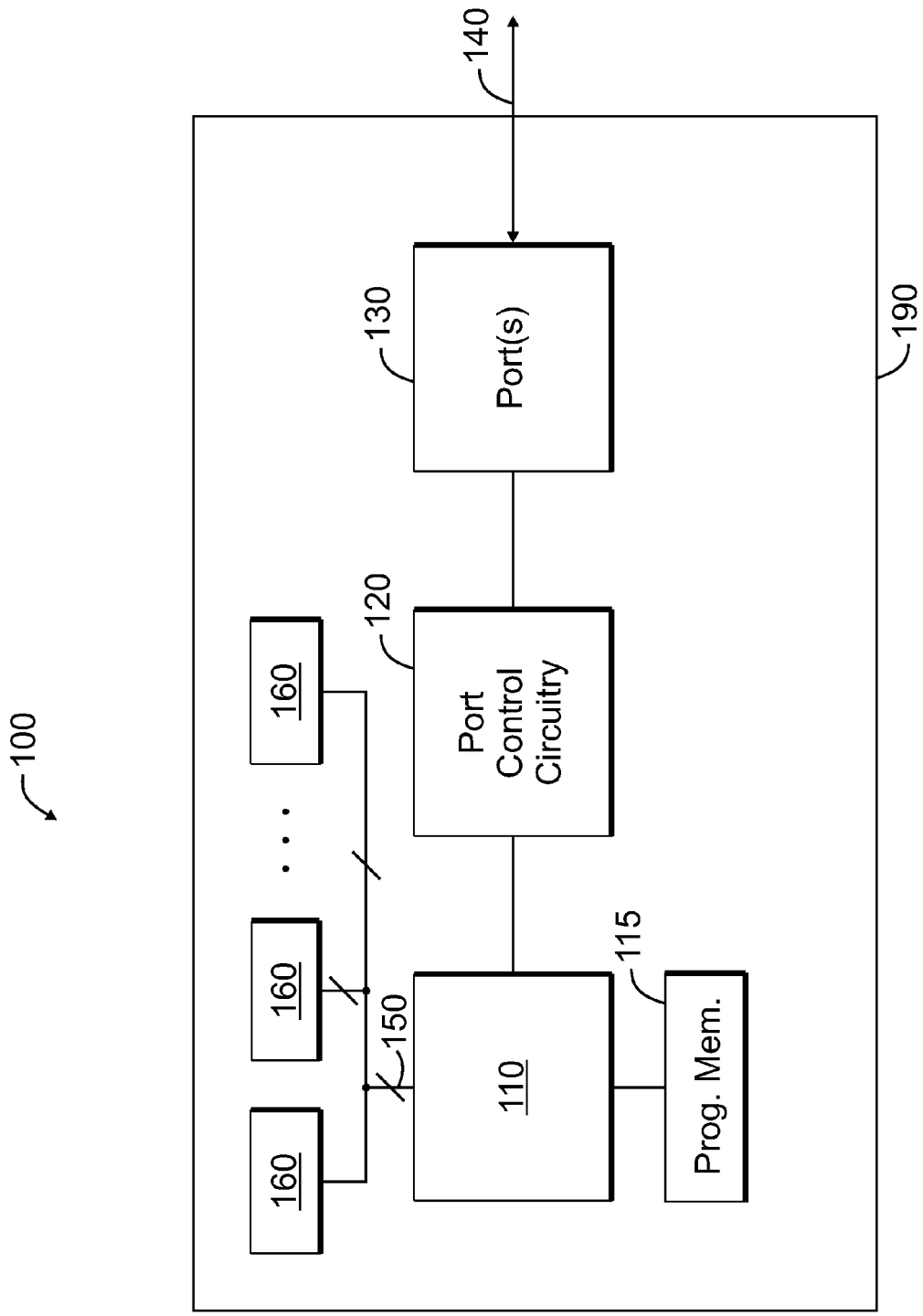
FIG. 1 illustrates a system according to an exemplary embodiment for controlling one or more ports.

FIG. 1 illustrates a system 100 according to an exemplary embodiment for controlling one or more ports. System 100 includes processor or processor core or circuitry 110. In exemplary embodiments, processor 110 may constitute a controller, microcontroller, processor core, microprocessor, DSP, field-programmable gate array (FPGA), programmable controller, or the like, as desired.

In exemplary embodiments, processor 110 may include one or more of integrated memory (including RAM, program memory, program RAM, etc., as desired), ROM, flash memory (or non-volatile memory generally), one-time programmable (OTP) circuitry, analog-to-digital converters (ADCs), digital-to-analog-converters (DACs), counters, timers, input/output (I/O) circuitry and controllers, reference circuitry, clock and timing circuitry (including distribution circuitry), arithmetic circuitry (e.g., adders, subtracters, multipliers, dividers, floating-point hardware), general and programmable logic circuitry, power regulators, and the like, as desired. Integrating one or more of the circuitry described above can improve the overall performance in some applications, for example, flexibility, responsiveness, die area, cost, materials used, power consumption, reliability, robustness, and the like, as desired.

In exemplary embodiments, processor 110 may have a variety of architectures and instruction sets. Examples include a complex instruction set computer (CISC), reduced instruction set computer (RISC) (e.g., an ARM core), very long instruction word (VLIW), etc. In exemplary embodiments processor 110 may use a variety of instruction decoding and execution schemes, such as microcode, direct decoding and execution, etc.

Furthermore, in exemplary embodiments, processor 110 may have a variety of data and address bus widths. For example, in some embodiments, processor 110 may have 8-bit or 16-bit address and/or data buses. In other exemplary embodiments, processor 110 may have 32-bit address and/or data buses, whereas in other exemplary embodiments, processor 110 may have 64-bit address and/or data buses, etc.

In exemplary embodiments, processor 110 receives program instructions and/or data from a source, such as program memory 115. In some embodiments, program memory 115 is separate from processor 110, e.g., a discrete part or device. In some embodiments, program memory 115 may be integrated on the same semiconductor die as processor 110.

System 100 may include a variety of ports or port types. For example, in some embodiments, the system may use memory-mapped ports. In some other embodiments, ports may have their own address space.

Processor 110 couples to port control circuitry 120. Port control circuitry 120 couples to port(s) 130, and controls the operation of port(s) 130, e.g., controlling or toggling port(s) 130.

Processor 110 may couple to one or more peripherals or bus masters (generally devices) 160 via bus 150. Device(s) 160 may constitute a wide variety of devices, such as DMA controllers, cache memories, memory controllers, buffers, controllers, such as serial bus controllers, hubs, or devices (e.g., universal serial bus, USB), and the like, as desired. Device(s) 160 may, in cooperation with processor 110, perform a variety of operations or functions for system 100, such as data or information processing, transfer, and the like.

Port(s) 130 may communicate with a variety of circuitry via coupling mechanism 140. Coupling mechanism may constitute any desired apparatus or circuitry for coupling port(s) 130 to circuitry external to system 100, such as a bus, backplane, conductors, etc. In this manner, port(s) 130 may transfer data or information to and from system 100.

In some embodiments, the various parts or subsystems of system 100 may reside in an integrated circuit 190. Note, however, that one may apply the port control or toggling mechanism or methods to a wide variety of circuitry and systems, as desired.

Figure 2:
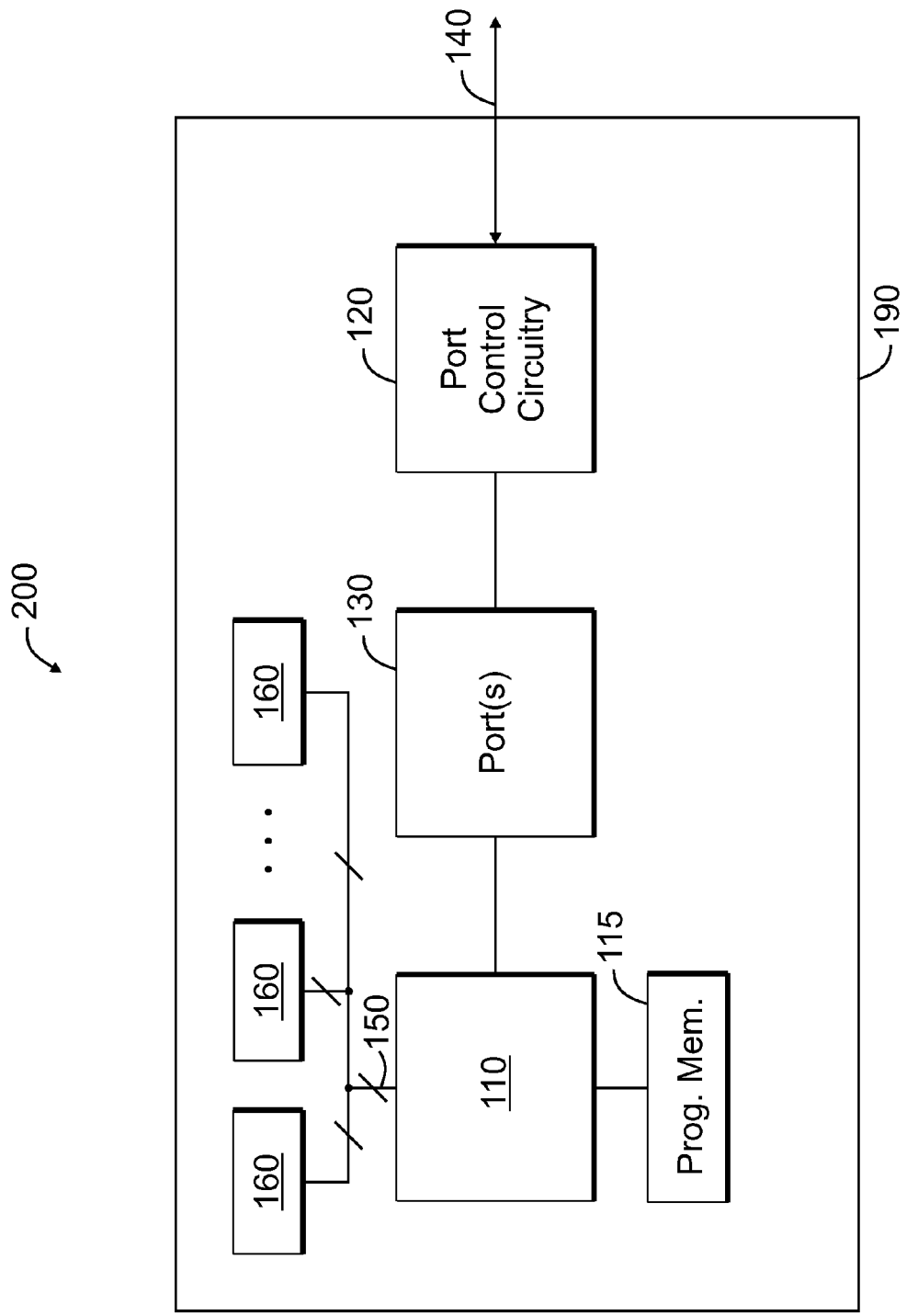
FIG. 2 depicts another system according to an exemplary embodiment for controlling one or more ports.

In some embodiments, the order of port control circuitry 120 and port(s) 130 may be reversed. In other words, depending on the implementation chosen or desired, in such embodiments processor 110 couples to port(s) 130, which in turn couple to port control circuitry 120. Port control circuitry 120 allows control or toggling of data or information written to port(s) 130. FIG. 2 shows such a circuit arrangement in a system 200 according to an exemplary embodiment.

Note that FIGS. 1 and 2 show conceptual or signal-flow diagrams of the circuitry within systems 100 and 200. One may make modifications to the circuitry shown without departing from the scope of the appended claims. For example, in some embodiments, some or all of the circuitry (including firmware, if any) corresponding to port(s) 130 may be combined with some or all of the circuitry (including firmware, if any) corresponding to port control circuitry 120.

Regardless of the exact architecture of system 100 (see FIG. 1) or system 200 (see FIG. 2), port control circuitry 120, operating cooperatively with port(s) 130 allows software control or toggling of port(s) 130. In exemplary embodiments, notwithstanding the operation of one or more devices 160, port control circuitry 120, operating cooperatively with port(s) 130 allows control or toggling of port(s) 130. In this manner, under the control of software, systems according to exemplary embodiments may control or toggle port(s) 130 in consecutive cycles (e.g., clock or instruction cycles), at specific or desired points in time (e.g., a specified or desired number of clock or instruction cycles), etc.

Figure 3:
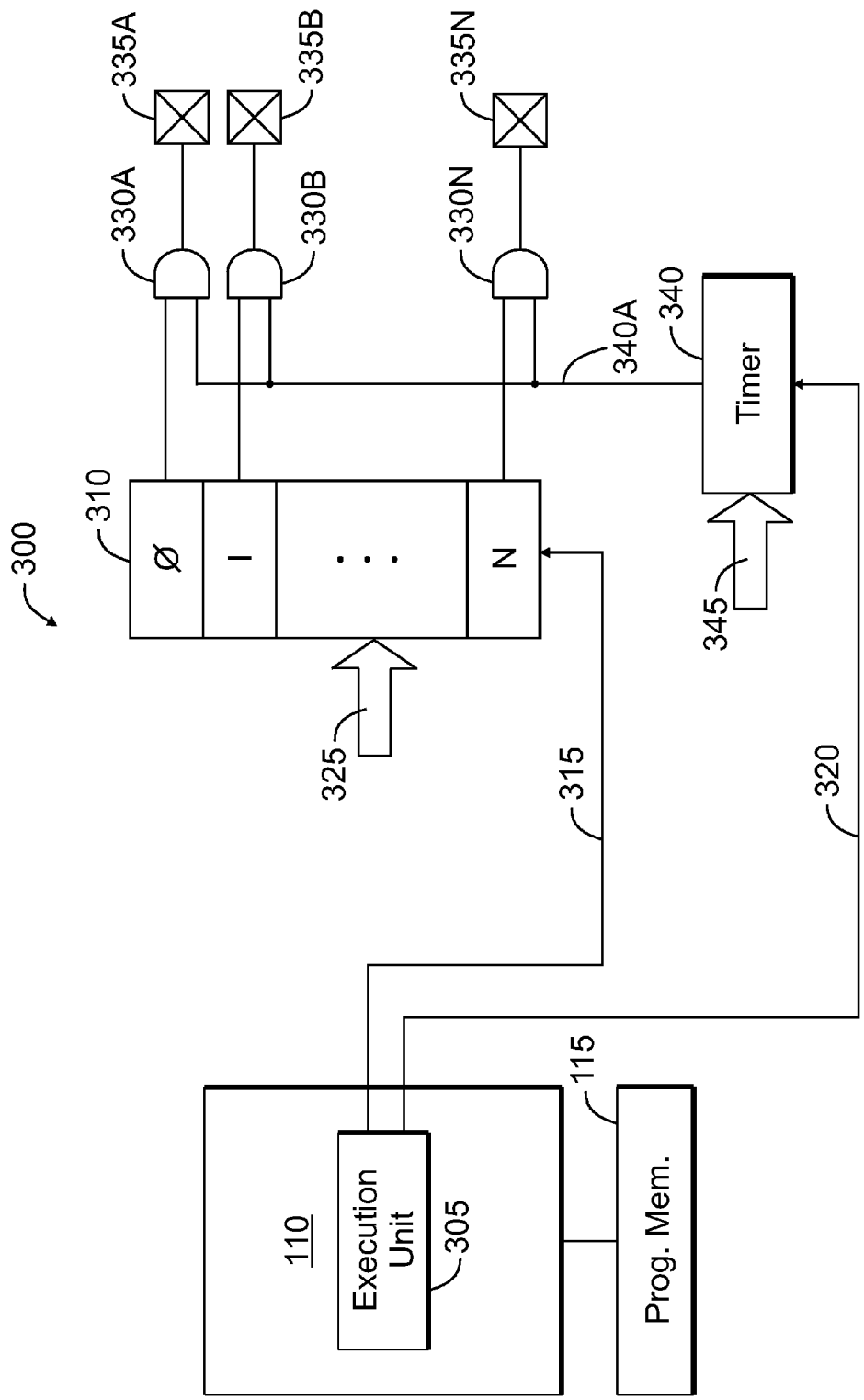
FIG. 3 shows a block diagram of a circuit arrangement for port control or toggling according to an exemplary embodiment.

FIG. 3 shows a block diagram of a circuit arrangement 300 for port control or toggling according to an exemplary embodiment. The embodiment shown in FIG. 3 uses a timer 340 to provide port control or toggling under software control.

Processor 110 receives one or more instructions received from a source, for example, from program memory 115 in the embodiments shown, or from another source (not shown). Processor 110 decodes (if needed) and executes the instruction(s) by using execution unit or circuit 305.

At least one of the instructions seeks to control or toggle a port, for example, the port corresponding to storage circuit 310. In exemplary embodiments, the instruction may have a variety of forms (e.g., machine language, assembly language, etc.).

In exemplary embodiments, storage circuit 310 may constitute a register, a set of flip-flops, a set of latches, etc., as desired. The following description refers to register 310 without limitation and without loss of generality. Register 310 may have a desired number of bits (generally N) that correspond to the width or size of the port, e.g., 0-31 for a 32-bit port.

Without loss of generality, assume that the instruction has the form:

STORE <PORT DESIGNATOR> <DATA> <DELAY>, where STORE refers to a store instruction (write to port), <PORT DESIGNATOR> denotes the port (corresponding to register 310), <DATA> denotes, in hexadecimal notation, the data to be written to the port, e.g., to toggle or control the port, and <DELAY> denotes the desired delay before writing to the port (controlling or toggling the port).

Suppose that one wishes to write the hexadecimal datum 0x5A5A to port PB1 after 5 clock cycles. In this example, the instruction would have the following form:

STORE PB1 0x5A5A 0x5.

When executed, the above instruction writes 0x5A5A to register 310 (which in this example corresponds to port PB1), which after 5 clock cycles is provided as the output of port PB1. More specifically, upon execution of the instruction, execution unit 305 causes, via control signal(s) 315, write data 325 (in this case, 0x5A5A) to be written to register 310.

Execution unit 305 also causes, via control signal(s) 345, a count value, in this case, 5, to timer 340, i.e., initializes and/or loads timer 340. Initially, timer 340 provides a binary logic 0 value via output 340A. Timer 340 counts up (or down, as desired, by making modifications to the embodiment shown) in response to a system or subsystem clock signal (not shown).

In exemplary embodiments, timer 340 may have an appropriate number of count bits to support the desired or specified maximum count values. Without limitation or loss of generality, as one example, in one exemplary embodiment timer 340 may support a maximum count value of 5 bits. In this embodiment, counter 340 may count from 0 to 31 (or 1 to 32, depending on the initial value used).

When the count value of timer 340 reaches the value specified by the instruction (in this example, 5), timer 340 asserts output 340A (drives output 340 to binary logic 1). Thus, in the example given, when timer 340 counts to 5, it provides a logic 1 value at output 340A.

Output 340A drives one input of AND gates 330A-330N. The output bits of register 310 drive the corresponding second inputs of AND gates 330A-330N. The outputs of AND gates 330A-330N drive a corresponding one of pins or port outputs 335A-335N.

Thus, before timer 340 reaches its final count value (in this case, 5), output 340A causes the outputs of AND gates 330A-330N to have a logic 0 value. As a result, port PB1 provides an output value of 0x0 via port outputs 335A-335N during this time period, regardless of the value stored in register 310 (0x5A5A in this example).

When timer 340 reaches the specified final count value (5, in this example), output 340A provides a logic 1 value to AND gates 330A-330N. In response to the logic 1 value at output 340A, the outputs of AND gates 330A-330N provide the value stored in register 310, i.e., 0x5A5A in this example, to port outputs 335A-335N, respectively.

Thus, the circuit arrangement shown in FIG. 3 provides a mechanism to toggle or control a port, e.g., PB1, under software control. Note that the delay (i.e., count value provided to timer 340) may have any arbitrary or desired value, such as a desired or specified number of clock cycles. Furthermore, because of the use of timer 340 and other circuitry shown, interaction between processor 100 and other circuitry in the system or subsystem (e.g., devices 160 in FIGS. 1-2) does not affect the timing of the control or toggling of the port(s).

By using a number of instructions, such as those described above, one may generate or synthesize a pulse or a series of pulses of arbitrary widths or durations. Specifically, one may use one instruction to generate a pattern of bits on port outputs 335A-335N. One may then use a subsequent instruction to alter the pattern of bits on port outputs 335A-335N. As an example, suppose one executes the following two instructions:

STORE PB1 0x5A5A 5
STORE PB1 0xA5A5 5

The first instruction (STORE PB1 0x5A5A 5) causes port outputs 335A-335N to provide as the output of port PB1 a pattern of bits corresponding to 0x5A5A after 5 clock cycles. The second instruction (STORE PB1 0xA5A5 5) causes port outputs 335A-335N to provide as the output of port PB1 a pattern of bits corresponding to 0xA5A5 after 5 clock cycles.

In other words, the second instruction toggles or inverts the pattern that the first instruction produces. Thus, by executing instructions, such as the instructions above, in tandem, one may generate or synthesize a pulse or a series of pulses of arbitrary widths or durations. Generally, one may generate an arbitrary or desired pattern of bits or words with arbitrary or desired timing, for example, producing an arbitrary or desired pattern of bits at the port output for a given or specified or desired number of clock cycles, toggling an arbitrary or desired pattern of bits at the port output after a given or specified or desired number of clock cycles, etc.

One may modify the circuit shown in FIG. 3 to provide additional features and enhancements, such as polling. For example, in some embodiments, execution unit 305 may poll output 340A of timer 340 to determine whether an instruction has finished its operation(s) or has finished execution. In this manner, execution unit 305 may delay executing the second (or follow-on) instruction that would change the port value (and therefore the output waveform or bit pattern) until the first (or preceding) instruction has completed (e.g., the timer has reached the final or terminal count value corresponding to <DELAY>). Thus, polling allows for the synchronization of multiple instructions.

In other exemplary embodiments, one may make the value of <DELAY> a global or common value for all or a set of instructions, rather than a value that may be modified per instruction (i.e., by each pertinent instruction, on a per-instruction basis). In such embodiments, the value of <DELAY> may be stored in a desired or appropriate location, such as a memory location, variable, parameter, register, etc. The value of <DELAY> may be provided to timer 340, for example, by causing a register in timer 340 to load the value, or may be made available to timer 340 as appropriate. In such embodiments, the instructions may omit (or lack) the value of <DELAY>, thus reducing the size of instructions (i.e., the number of bits used to code or store the instructions, for example, in program memory 115).

In still other exemplary embodiments, one may mask the data that are ultimately output by the port. More specifically, one may use a mask pattern to mask which bits of data propagate to the port and are therefore provided as output bits by port outputs 335A-335N. In some embodiments, one may implement this masking function by using a third input on AND gates 330A-330N, and drive each of the third inputs by a respective mask bit. In some embodiments, one may use additional AND gates (not shown in FIG. 3) to mask write data 325 before writing the data to register 310.

As another enhancement, in some exemplary embodiments one may use or specify two port states in an instruction to generate arbitrary waveforms or bit patterns under software control. Put another way, the instruction includes data for both the current (first) and next (second) states of the port, e.g., data or bits output by the port.

Figure 4:
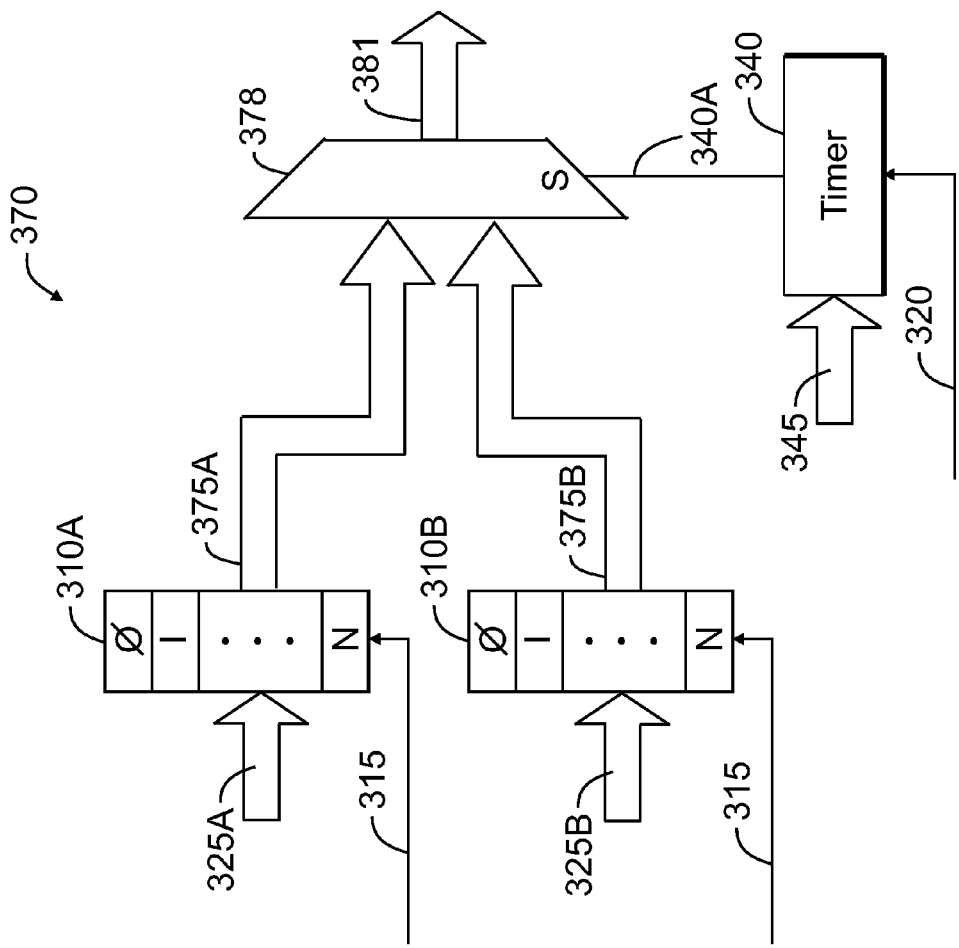
FIG. 4 depicts a block diagram of a circuit arrangement for port control or toggling according to another exemplary embodiment.

By way of example and without limitation or loss of generality, an instruction that includes data for both the current state (first state) and the next state (second state) of the port may have the following form in exemplary embodiments:

STORE <PORT DESIGNATOR> <CUR_DATA> <NEXT_DATA> <DELAY>, where <CUR_DATA> and <NEXT_DATA> denote, respectively, the data for the current and next states of the port. In this manner, one instruction may control or toggle the port using two data or bit patterns. Note that in some embodiments one may use such an instruction, but with two <DELAY> fields, one to specify the delay for the current state of the port, and the other to specify the delay for the next state of the port FIG. 4 depicts a block diagram of a circuit arrangement 370 for port control or toggling using this scheme. More specifically, the circuit uses two registers 310A and 310B. Register 310A holds or stores the data for the current (first) port state, whereas register 310B holds or stores the data for the next (second) port state.

When executed, the above instruction writes the current and next state data to registers 310A and 310B, respectively. More specifically, upon execution of the instruction, execution unit 305 causes, via control signal(s) 315, write data 325A and write data 325B to be written to registers 310A and 310B, respectively.

Execution unit 305 also causes, via control signal(s) 345, a count value, corresponding to <DELAY>, to timer 340, i.e., initializes and/or loads timer 340. Output 340A of timer 340 drives the select input of multiplexer (MUX) 378. MUX 378 accepts as inputs the outputs of registers 310A and 310B, i.e., output data 375A and 375B, respectively.

Initially, timer 340 provides a binary logic 0 value via output 340A. In this situation, the output data 375A of register 310A are provided as output signals of MUX 378, which ultimately drive the output data of the port.

Timer 340 counts up (or down, desired, by making modifications to the embodiment shown) in response to a system or subsystem clock signal (not shown). When the count value of timer 340 reaches the value specified by the instruction (either one or two delay values, as described above), timer 340 asserts output 340A (drives output 340 to binary logic 1).

The logic 1 value of output 340A drives the select input of MUX 378. In response, MUX 378 provides the output data 375B of register 310B as the port output data.

In exemplary embodiments, timer 340 may have an appropriate number of count bits to support the desired or specified maximum count values. Without limitation or loss of generality, as one example, in one embodiment, timer 340 may support a maximum count value of 5 bits. In this embodiment, counter 340 may count from 0 to 31 (or 1 to 32, depending on the initial value used).

One may modify the circuit shown in FIG. 4 to provide additional features and enhancements, such as polling (described above in detail). For example, in some embodiments, execution unit 305 may poll output 340A of timer 340 to determine whether an instruction has finished its operation(s) or has finished execution. To ensure that both the current and next state data have been output by the port, execution unit 305 may poll output 340A of timer 340 twice, as desired.

In other exemplary embodiments, one may make the value of <DELAY> a global or common value for all or a set of instructions, rather than a value that may be modified per instruction (i.e., by each pertinent instruction, on a per-instruction basis). Alternatively, one may use two values of <DELAY>, as described above, i.e., one for each of the current and next states.

In such embodiments, the value(s) of <DELAY> may be stored in a desired or appropriate location (or locations), such as in a memory, variable(s), parameter(s), register, etc. The value(s) of <DELAY> may be provided to timer 340, for example, by causing a register in timer 340 to load the value (s), or may be made available to timer 340 as appropriate. In such embodiments, the instructions may omit (or lack) the value(s) of <DELAY>, thus reducing the size of instructions (i.e., the number of bits used to code or store the instructions, for example, in program memory 115).

In still other exemplary embodiments, as described above, one may mask the data that are ultimately output by the port. More specifically, one may use one or more mask patterns to mask which bits of data propagate to the port and are therefore provided as output bits by port outputs 335A-335N for the current state and/or next state. One may implement the masking function in a variety of ways, as described above in detail.

Figure 5:
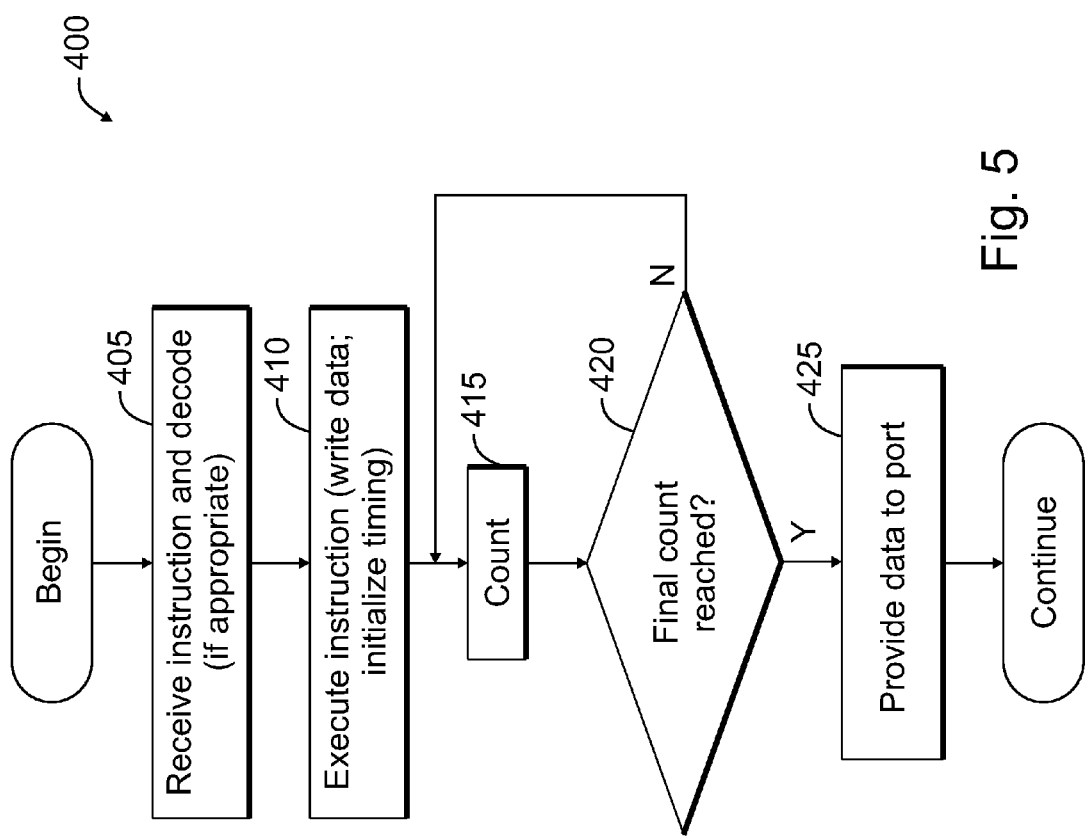
FIG. 5 illustrates a flow diagram for a method of controlling or toggling a port according to an exemplary embodiment.

FIG. 5 depicts a flow diagram 400 for a method of controlling or toggling a port according to an exemplary embodiment. At 405, an instruction for port control or toggling is received. If appropriate, the instruction is also decoded.

At 410, the instruction is executed. More specifically, the desired or specified data (for ultimately writing to the destination port) are stored or written to a storage location or device. Also, a timing or counting operation (e.g., by using a timer or counting through other means) is initiated. In some embodiments, at 410 a poll may be conducted to determine whether a previous instruction has finished execution, as described above. Also, in some embodiments, at 410 the desired or specified data (for ultimately writing to the destination port) may be masked using a desired or specified mask pattern before the data are stored or written to the storage location or device.

At 415, the timing or counting operation proceeds (e.g., timing up or down, depending on implementation). At 420, a test is made to determine whether the final or desired count value (corresponding to a specified or desired delay) has been reached. If not, control returns to 415, where the timing operation proceeds further.

If the final or desired count value has been reached, however, at 425 the provided data (written or stored at 410, see above) are written to the destination port. In other words, the port is controlled or toggled using the provided or desired data.

Figure 6:
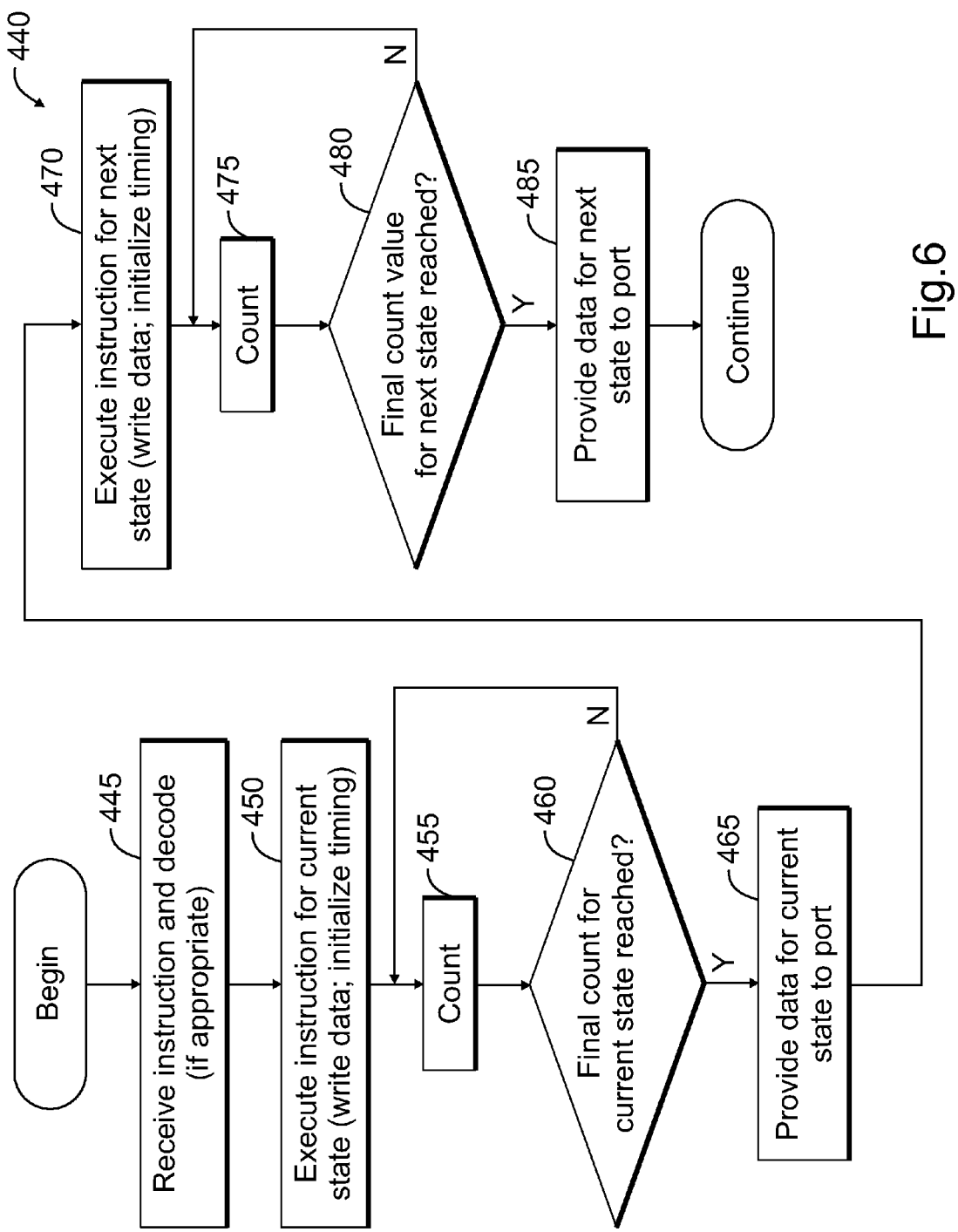
FIG. 6 depicts a flow diagram for a method of controlling or toggling a port according to another exemplary embodiment.

FIG. 6 depicts a flow diagram 440 for a method of controlling or toggling a port according to another exemplary embodiment. Specifically, flow diagram 440 corresponds to controlling or toggling a port for both the current state (a first state) and next state (a second state).

At 445, an instruction for port control or toggling is received. If appropriate, the instruction is also decoded. At 450, the instruction is executed for the current state. More specifically, the desired or specified data (for ultimately writing to the destination port) are stored or written to a storage location or device for the current state. Also, a timing or counting operation (e.g., by using a timer or counting through other means) is initiated for the current state.

In some embodiments, at 450 a poll may be conducted to determine whether a previous instruction has finished execution, as described above. Also, in some embodiments, at 450 the desired or specified data for the current state (for ultimately writing to the destination port) may be masked using a desired or specified mask pattern before the data are stored or written to the storage location or device, for example, as described above.

At 455, the timing or counting operation proceeds (e.g., timing up or down, depending on implementation). At 460, a test is made to determine whether the final or desired count value (corresponding to a specified or desired delay) has been reached for the current state. If not, control returns to 455, where the timing operation proceeds further.

If the final or desired count value has been reached for the current state, however, at 465 the provided data for the current state (written or stored at 450, see above) are written to the destination port. In other words, the port is controlled or toggled using the provided or desired data.

Subsequently, at 470, the instruction is executed for the next state. The desired or specified data (for ultimately writing to the destination port) are stored or written to a storage location or device for the next state. Also, a timing or counting operation (e.g., by using a timer or counting through other means) is initiated for the next state.

In some embodiments, at 470 a poll may be conducted to determine whether a previous instruction has finished execution, as described above. Also, in some embodiments, at 470 the desired or specified data for the next state (for ultimately writing to the destination port) may be masked using a desired or specified mask pattern before the data are stored or written to the storage location or device, for example, as described above.

At 475, the timing or counting operation proceeds (e.g., timing up or down, depending on implementation). At 480, a test is made to determine whether the final or desired count value (corresponding to a specified or desired delay) has been reached for the next state. If not, control returns to 475, where the timing operation proceeds further.

If the final or desired count value has been reached for the next state, however, at 485 the provided data for the next state (written or stored at 470, see above) are written to the destination port. In other words, the port is controlled or toggled using the provided or desired data.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation as will be evident to persons of ordinary skill in the art. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosed concepts.

The invention claimed is:

1. A method of controlling a port in an apparatus, the method comprising:
   receiving an instruction for execution by a processor;
   executing the instruction, by writing a first value to a first storage location corresponding to the port, and by initializing a first count operation;
   proceeding with the first count operation until a first final count value is reached;
   performing a logical AND operation on a signal corresponding to the first count operation and the first value; and
   writing the result of the logical AND operation to the first storage location.

2. The method according to claim 1, further comprising:
   writing a second value to a second storage location corresponding to the port, and by initializing a second count operation;
   proceeding with the second count operation until a second final count value is reached; and
   providing to the port the second value written to the second storage location.

3. The method according to claim 1, wherein the first value corresponds to current state data for the port.

4. The method according to claim 2, wherein the second value corresponds to next state data for the port.

5. The method according to claim 2, wherein the first and second values are selected so as to generate an arbitrary waveform at an output of the port.

6. The method according to claim 1, wherein the first counting operation comprises counting clock cycles of a clock signal of the apparatus.

7. The method according to claim 2, wherein the second counting operation comprises counting clock cycles of a clock signal of the apparatus.

8. An apparatus, comprising:
   a processor to receive an instruction and to execute the instruction;
   a first storage device to store a first datum derived from the instruction, the first datum to be provided to a port; and
   a timer to count to a first count value before providing an output signal used to provide the first datum to the port, wherein the first datum is provided to the port by performing a logical AND operation on the output signal of the timer and the first datum and by writing the result of the logical AND operation to the port.

9. The apparatus according to claim 8, wherein the instruction comprises the first datum.

10. The apparatus according to claim 8, wherein the instruction comprises the first count value.

11. The apparatus according to claim 8, wherein the first storage device comprises a register.

12. The apparatus according to claim 8, wherein the output signal of the timer is polled before the first datum is provided to the port.

13. The apparatus according to claim 8, wherein the first datum is masked with a bit pattern before being stored in the first storage device.

14. The apparatus according to claim 8, further comprising:
   a second storage device to store a second datum derived from the instruction, the second datum to be provided to a port,
   wherein the timer counts to a second count value before providing the output signal, wherein the output signal is used to provide the second datum to the port.

15. The apparatus according to claim 14, wherein the first datum corresponds to a first state of the port, and wherein the second datum corresponds to a second state of the port.

16. The apparatus according to claim 15, wherein the first and second states of the port correspond, respectively, to current and next states of the port.

17. The apparatus according to claim 15, wherein a multiplexer provides the first datum or the second datum to the port in response to the output signal of the timer.

18. A method of using a processor to generate at least one pulse at an output of a port coupled to the processor, the method comprising:
   receiving a program instruction, and decoding the program instruction to derive a datum and a count value;
   executing the program instruction by storing the datum and by initializing a count;
   counting until a final count value is reached;
   performing a logical AND operation on a signal corresponding to the counting and the datum; and
   writing the result of the logical AND operation to the port.

19. The method according to claim 18, wherein a plurality of program instructions are received and executed in order to generate an arbitrary waveform at the output of the port, wherein the arbitrary waveform comprises the at least one pulse.

* * * * *